US 10,404,664 B2

(12) United States Patent
Gleichauf

(10) Patent No.: US 10,404,664 B2
(45) Date of Patent: Sep. 3, 2019

(54) APPARATUS AND METHODS FOR INCREASING SECURITY AT EDGE NODES

(71) Applicant: ARM IP Limited, Cambridge (GB)

(72) Inventor: Paul Harry Gleichauf, Los Altos, CA (US)

(73) Assignee: ARM IP Limited, Cambridge (GB)

( * ) Notice: Subject to any disclaimer, the term of this patent is extended or adjusted under 35 U.S.C. 154(b) by 83 days.

(21) Appl. No.: 15/333,493

(22) Filed: Oct. 25, 2016

(65) Prior Publication Data
US 2018/0115522 A1 Apr. 26, 2018

(51) Int. Cl.
| | |
|---|---|
| H04L 29/06 | (2006.01) |
| H04L 29/08 | (2006.01) |
| G06F 8/65 | (2018.01) |
| G06F 8/61 | (2018.01) |
| G06F 9/4401 | (2018.01) |
| H04W 84/18 | (2009.01) |
| G06F 21/51 | (2013.01) |
| G06F 21/53 | (2013.01) |
| G06F 21/57 | (2013.01) |
| H04L 12/24 | (2006.01) |

(52) U.S. Cl.
CPC ............ *H04L 63/0281* (2013.01); *G06F 8/61* (2013.01); *G06F 8/65* (2013.01); *G06F 9/4406* (2013.01); *G06F 21/51* (2013.01); *G06F 21/53* (2013.01); *H04L 29/06* (2013.01); *H04L 29/08* (2013.01); *H04L 67/28* (2013.01); *H04L 67/34* (2013.01); *H04W 84/18* (2013.01); *G06F 21/575* (2013.01); *H04L 41/0886* (2013.01)

(58) Field of Classification Search
CPC ......... H04W 28/10; G06F 8/65; H04L 41/082
USPC .......................................................... 726/12
See application file for complete search history.

(56) References Cited

U.S. PATENT DOCUMENTS

| | | | | |
|---|---|---|---|---|
| 7,310,664 B1 * | 12/2007 | Merchant | ............ | H04L 41/0886 709/220 |
| 2014/0047425 A1 * | 2/2014 | Thapar | ...................... | G06F 8/65 717/168 |
| 2017/0171778 A1 * | 6/2017 | Britt | ...................... | H04W 28/10 |
| 2018/0034793 A1 * | 2/2018 | Kibalo | .................. | G06F 21/575 |

FOREIGN PATENT DOCUMENTS

| | | |
|---|---|---|
| JP | 2006-228060 | 8/2006 |
| WO | WO 2016/162382 | 10/2016 |

OTHER PUBLICATIONS

International Search Report and Written Opinion of the International Searching Authority dated Dec. 8, 2017 in PCT/GB2017/053014, 14 pages.

* cited by examiner

*Primary Examiner* — Bryan F Wright
(74) *Attorney, Agent, or Firm* — Nixon & Vanderhye P.C.

(57) ABSTRACT

A machine implemented method for protecting at least one edge node in a network of nodes is provided. The method comprising: communicatively coupling said at least one edge node with a proxy node; providing an application for said at least one edge node in an isolated area associated with said at least one edge node at said proxy node; determining that an update for said at least one edge node is required; increasing a reboot frequency of said at least one edge node following said determination that an update is required; and increasing a reboot frequency of said proxy node following said determination that an update is required.

17 Claims, 12 Drawing Sheets

APPARATUS AND METHODS FOR INCREASING SECURITY AT EDGE NODES

The present techniques relate to apparatus and methods for increasing security at simple Internet of Things devices. More particularly, the techniques relate to increasing security at simple Internet of Things devices through a combination of a proxy node and defensive secure reboots.

It is known that simple Internet of Things (IoT) devices do not have the capabilities to provide complex security functions, and as a result there are widespread concerns that the Internet of Things will be hamstrung by security attacks and information leaks.

According to a first technique, there is provided machine-implemented method for protecting at least one edge node in a network of nodes. The method comprises: communicatively coupling said at least one edge node with a proxy node; providing an application for said at least one edge node in an isolated area associated with said at least one edge node at said proxy node; determining that an update for said at least one edge node is required; increasing a reboot frequency of said at least one edge node following said determination that an update is required; and increasing a reboot frequency of said proxy node following said determination that an update is required.

Increasing the reboot frequency frustrates an attacker's ability to maintain a corrupted infection since the boot image remains untainted. In addition, increasing security at edge nodes will result in increased security and stability across the entire network.

According to a second technique, there is provided a machine-implemented method for protecting at least one edge node in a network of nodes. The method comprises: communicatively coupling said at least one edge node with a proxy node; providing an application for said at least one edge node in an isolated area associated with said edge node at said proxy node; determining that an update for said edge node is available; installing said update in said isolated area associated with said at least one edge node; and rebooting said at least one edge node and said proxy node following installation of said update.

Delegating the update function to a proxy node enables the edge nodes to be kept as simple IoT devices, whist having enhanced functionality.

According to a third technique, there is provided a computer program product comprising computer code for performing the above described methods.

According to a fourth technique, there is provided a proxy node for protecting at least one edge node in a network of nodes. The proxy node comprises: a communications module for communicatively coupling said proxy node with said at least one edge node, such that all communications to and from said at least one edge node go through said proxy node; and at least one isolated area, said at least one isolated area associated with said at least one edge node and configured to store said associated edge nodes application software.

According to a fifth technique, there is provided an edge node. The edge node comprises: a secured communications module for storing secure communications software, said secure communications software linked to applications software for said edge node stored at a proxy node.

By providing the edge node application at the proxy node, the edge node does not require the resources to install the update and can be a simple, low cost IoT devices and increasing the protection available to the edge node, and the overall system.

Embodiments will now be described with reference to the accompanying figures of which:

Edge nodes, such as simple Internet of Things (IoT) devices, often do not have the resources needed to protect themselves adequately from security threats. To increase the security of simple IoT devices, the more complex functions, such as security functions, applications and updates are delegated to a nearby proxy node. A proxy node being any device, within communication range of the edge node that has the required resources to perform the more complex functions on behalf of the edge node. When a security threat is detected the edge nodes and the proxy node increase their reboot frequency so that an attacker's ability to maintain a corrupted infection state is frustrated. In addition, when an update becomes available, the proxy node installs, configures and runs the update so that the edge node does not require the resources to provide the update. After the installation of an update, the reboot frequency is decreased to a normal operating frequency.

An edge node may be any device having constrained capabilities, such as power, computational resources, storage/memory, and/or network capacity. The edge nodes capabilities are normally constrained as a result of cost and energy. For example, an edge node may be a small, battery powered, Internet of Things (IoT) device designed for a purpose-specific application. When an IoT device is battery powered, unless that battery can be recharged to maintain a relatively high-energy state, then that device will always be more limited in what it can compute, store and/or communicate in comparison to powered nodes. Sensors for measuring and actuators for controlling are examples of edge nodes.

Edge nodes often have constrained capabilities and therefore, there is only a limited amount of protection that such an edge node can provide for itself. For example, a small battery powered device, often cannot afford to perform complicated cryptographic operations, but it may have the resources to perform simpler forms of encryption. In order to increase security functions at an edge node, the edge node may be provided with increased capabilities. However, increasing the capabilities also increases costs.

In addition, the installation of a software update at an edge node may consume a lot of resources, which the edge node may not have or may not be able to spare. For example, the installation of a software update may require more bandwidth then is available to the communication channels used by the edge node. In addition, most updates enable rollback in case of failure, which requires a copy of the original software to be kept in case the update fails. However, an edge node may not have or may not be able to spare the required storage for such rollbacks.

Figure 1:
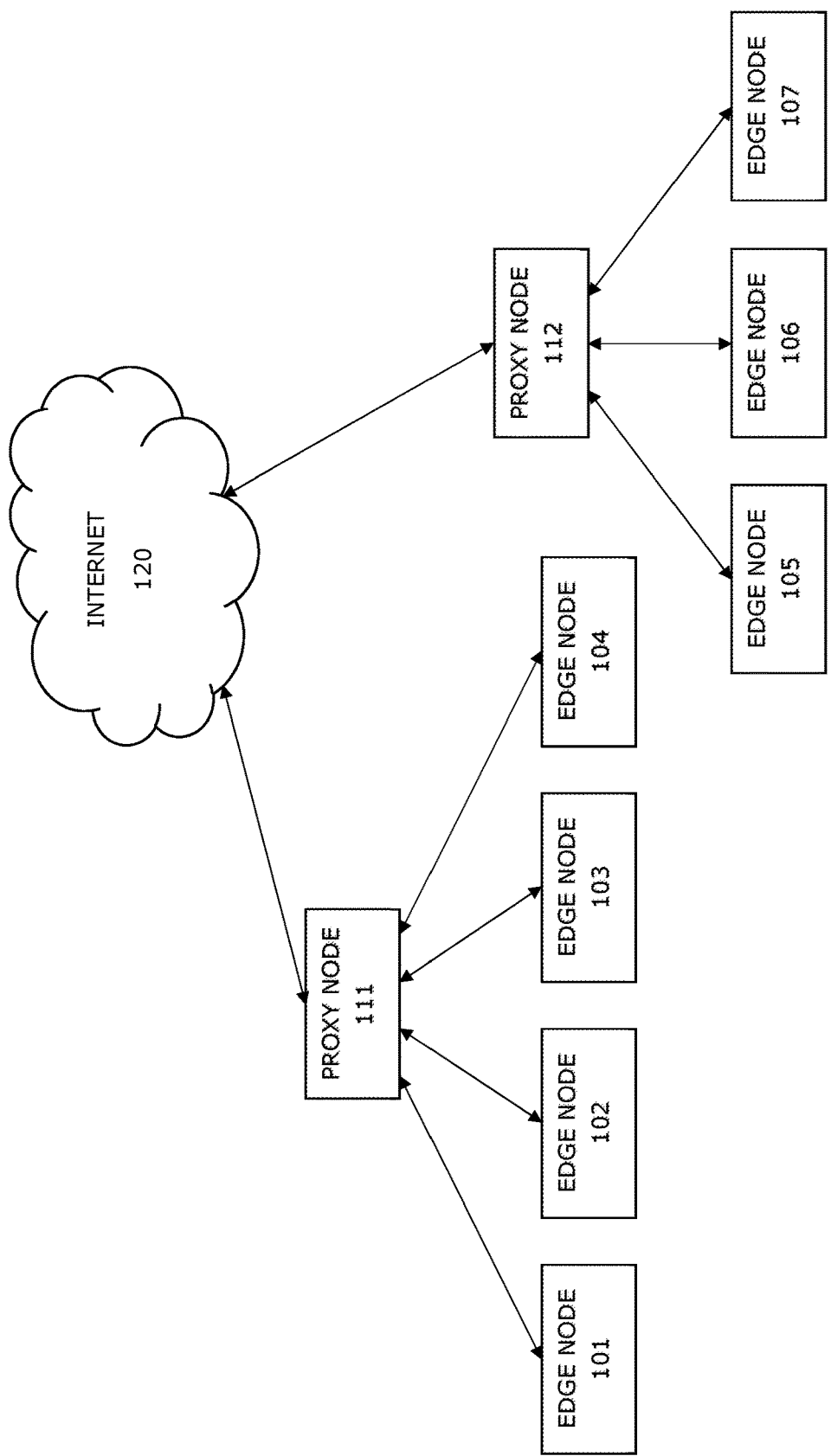
FIG. 1 illustrates schematically a network of connected nodes.

An edge node is provided in a network of connected nodes. As illustrated in FIG. 1, a plurality of edge nodes 101, 102, . . . , 107 may be provided. The edge nodes are provided at the perimeter (edge) of the network. Each edge node 101, 102, . . . , 107 is capable of communicating with a proxy node 111, 112 also provided in the network of nodes.

For the avoidance of doubt the term "plurality" means any number, at least one.

A proxy node may be any device having less constrained capabilities than the edge node to which it is communicatively coupled. For example, a proxy node may be an IoT device, most likely line powered and a server class machine, though it may be an embedded one. The proxy node may be a subcomponent of a larger device, such as a gateway, containing one or more proxy nodes. A network middlebox (e.g. firewall) and a WiFi router are both examples of a gateway capable of hosting a proxy node.

Typically, the proxy node is located at the end of the first physical hop, wired or wireless, from the edge node. The proxy node is normally the closest, in terms of distance, proxy node to the edge node, which the edge node is capable of communicating with. Generally, the proxy node is physically nearby to the edge node in order to minimize latency.

The edge node and the proxy node should have a secure communications link. For example, the communications link could be by Transport Layer Security (TLS), Datagram Transport Layer Security (DTLS) or Constrained Application Protocol (CoAP) depending upon the nature of the traffic. Lower level mechanisms, such as MACsec L2 mutual authentication and encryption for devices separated by a single physical hop, are also possible, as well as HTTPS for secured multi-hop application layer traffic.

The proxy node selectively controls communications to and from the edge nodes, once an edge node has linked to the proxy node, such that all communications to and from the linked edge node go through the proxy node. Communications to the edge nodes includes updates for the edge nodes that originate from a third party. Communications from the edge nodes includes communications to services that aggregate data from the edge nodes.

The more complex functions, such as the security functions, applications and updates for the edge node are delegated to a proxy node. As illustrated in FIG. 1, each proxy node can provide the security functions, applications and updates for more than one edge node. This delegation of the more complex functions, such as the security functions, applications and updates to the proxy nodes enables the edge nodes to be kept as simple, low cost IoT devices, while the proxy nodes provide a security-hardened protection boundary behind which the edge nodes can shelter. In addition, one proxy node provides the more complex functions for many edge nodes further minimising costs.

Each proxy node has less constrained capabilities than the edge node(s) to which it is communicatively coupled, such that the proxy node has the resources available to provide the security functions, applications and updates for the edge node(s). Although proxy nodes could run all software natively, security may be increased by using an isolation mechanism such as a hypervisor that hosts each functional component (proxy nodes, middlebox services, etc.) in independent isolated areas. These isolated areas decrease the attack surface as well as the data they manage. They can also be independently restarted as needed. Therefore, each proxy node should be capable of isolated functionality, such that data sources can be protected from one another and programs can be run in isolation.

Each proxy node may provide the security functions, applications and updates for many different types of edge nodes/different edge nodes. Therefore, each proxy node is provided with an isolated area for each different type of edge node, so that an update which is run for a first type of edge node, is run in isolation, it does not update the other types of edge nodes to which the proxy node is coupled. In addition, when an isolated area is required for each node, rather than each type of edge node, for example when different versions of edge node are coupled to the same proxy node and the different versions of the edge nodes have incompatible software, then a proxy node may be provided with an isolated area for each edge node. The proxy node may then run an update for a first edge node, which does not update the other edge nodes to which the proxy node is coupled.

Figure 2:
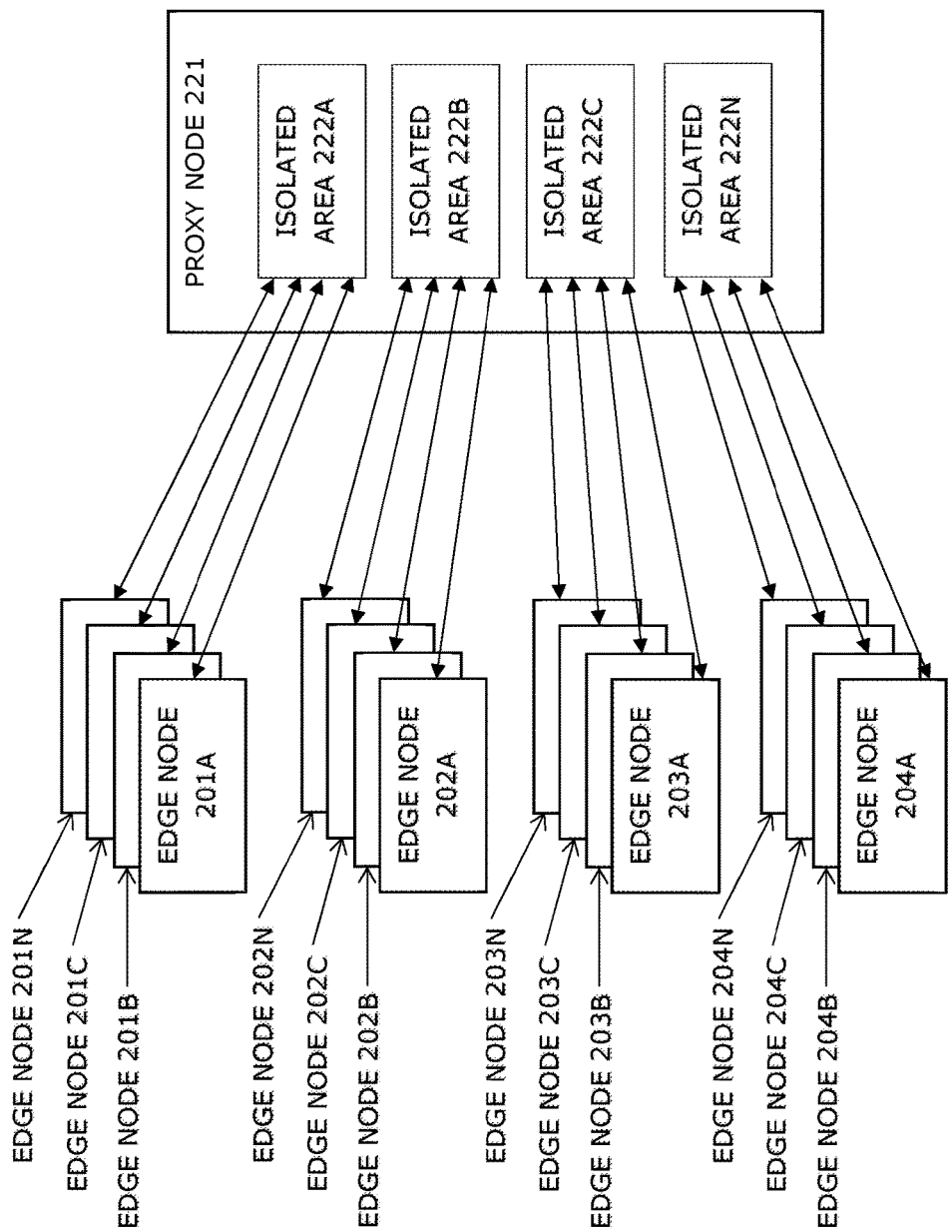
FIG. 2 illustrates schematically a proxy node comprising a plurality of isolated areas.

FIG. 2 schematically illustrates a proxy node 221 comprising a plurality of isolated areas 222A, 222B, 222C, . . . , 222N, each isolated area being provided for each different type of edge node to which the proxy node is communicatively coupled. According to another embodiment, a proxy node may comprise a plurality of isolated areas 222A, 222B, 222C, . . . , 222N, each isolated area being provided for each different edge node to which the proxy node is communicatively coupled. A proxy node may comprise at least one isolated area. Each isolated area 222A, 222B, 222C, . . . , 222N provides a protected area isolated from the other isolated areas and capable of isolated functionality, such that each isolated area 222A, 222B, 222C, . . . , 222N can provide the security functions and updates appropriate for an edge node/type of edge node to which the proxy node 221 is communicatively coupled.

An isolated area may be provided in either hardware or software. Isolation means that a failure does not impact other applications running in the proxy node. However, an isolated area may not necessarily be completely isolated from all of the other proxy components, or the larger node of which the proxy node may be subcomponent. The isolated area is provided to enable data sources to be protected from one another and programs to be run in isolation, such that updates for edge nodes are not applied across all the edge nodes to which the proxy node is coupled. The isolated area may be implemented using any security mechanism for creating secure isolation that protects data sources from one another and enables programs to be runs in isolation. For example, virtual machines, containers and sandboxes are all mechanisms for implementing secure isolation. The isolated area may comprise a physical partition or a separate device. It may also comprise a virtual entity in which the various physical partitions or devices are controlled at a higher level of abstraction using a redirection layer in the hardware-firmware-software stack.

As stated above, all communications to and from the edge nodes to services and devices in the network go through the proxy node, where protective services (e.g. middlebox security services such as NAT, conventional and application firewalls, intrusion detection, intrusion prevention, policy/authorization controllers, etc.) start and end respectively, to shield the edge nodes. These services typically run inside isolated areas. Encrypted channels from the edge nodes terminate at the proxy node, and locally protected content from the edge nodes can then be re-encrypted and forwarded deeper into the network. In addition, encrypted channels from services and devices in the network terminate at the proxy node, and content from the services and devices, such as updates, can then be re-encrypted and forwarded to the edge nodes. The proxy node is one end of secure channels to the edge nodes as well as to the upstream nodes. It is therefore a "man-in-the-middle" point that should be secure in order to protect against attacks that will naturally be focused upon it.

According to one embodiment, an isolated area within a proxy node comprises a virtual machine. According to another embodiment, an isolated area comprises a container. For simplicity, the following description will refer to virtual machines, however, any isolated area capable of isolated functionality can be used in place of the virtual machines described with reference to FIG. 3, at the proxy node.

Figure 3:
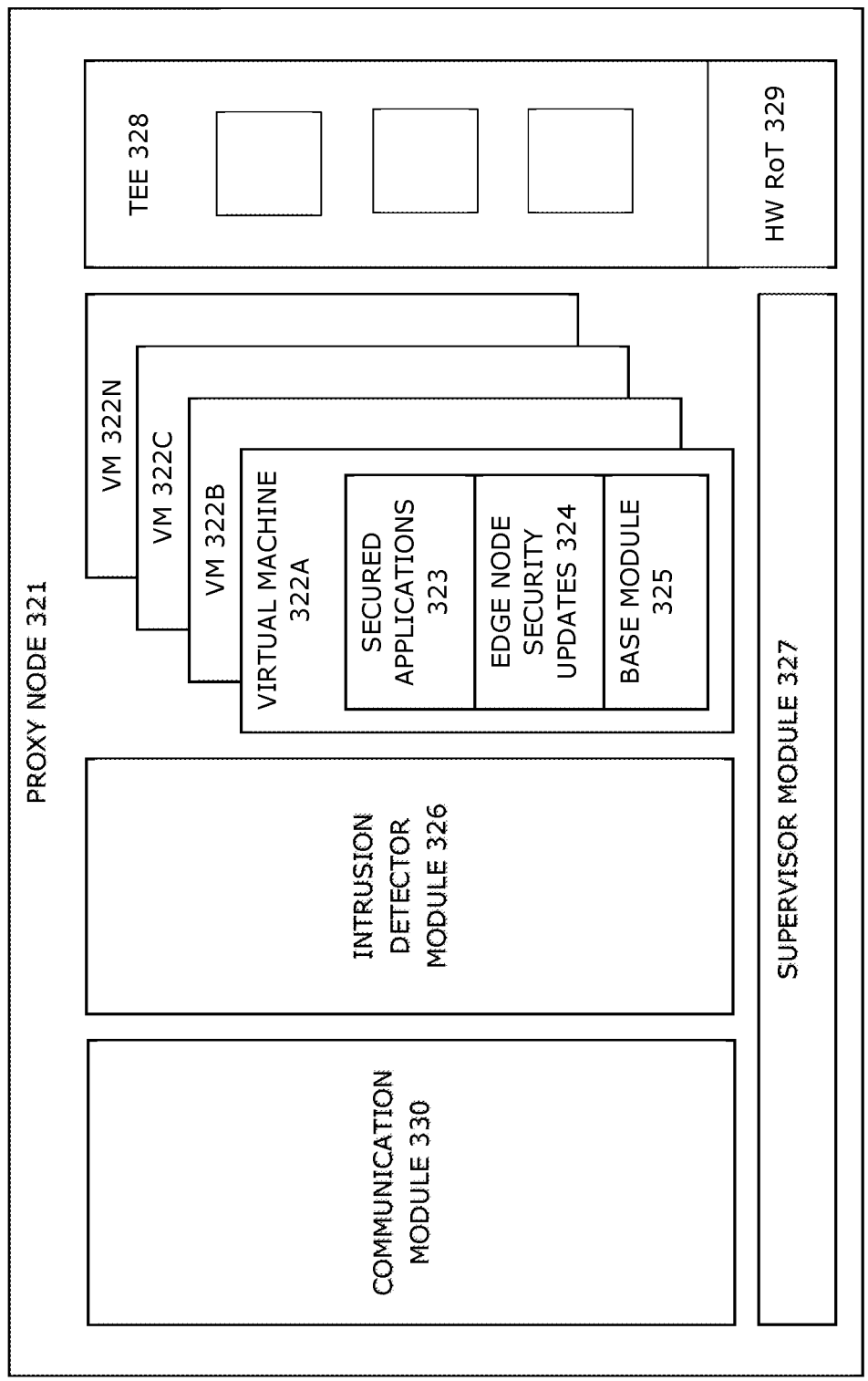
FIG. 3 illustrates schematically a proxy node comprising a plurality of virtual machines.

FIG. 3 schematically illustrates a proxy node 321. The proxy node 321 comprises at least one virtual machine 322 (isolated area). The proxy node may comprise a plurality of virtual machines 322A, 322B, 322C, . . . , 322N, a different virtual machine being provided for each different type of edge node to which the proxy node is communicatively coupled. In another embodiment, a proxy node may comprise a plurality of virtual machines 322A, 322B, 322C, . . . , 322N, a different virtual machine being provided for each different edge node to which the proxy node is communicatively coupled. In both embodiments, each of the virtual machines 322A, 322B, 322C, . . . , 322N provides a protected area isolated from the other virtual machines and capable of isolated functionality, such that the proxy node 221 is capable of providing the security functions and updates for the edge nodes to which it is communicatively coupled.

Each isolated area, such as the virtual machines 322A, 322B, 322C, . . . , 322N comprise the current uncorrupted software stack of record, any new updates and any new pending data. The current software stack may include the OS, the secured application of the edge node for which the isolated area is provided, an accepted update/chain of accepted updates, and a data file including keys (or references to a secure storage where the keys are held) and historical records. The keys enable the proxy node to establish and maintain secure communications with the edge node for which the isolated area is provided.

The secured application may be stored in a secured application module 323 of the isolated area. The accepted update/chain of accepted updates, where there has been more than one update, may be stored in an edge node security updates module 324 of the isolated area. The OS and the data file may be stored in a base module 325 of the isolated area. In addition, any new updates that have not yet been successfully installed may be stored in the edge node security updates module 324 and any new pending data may be stored in the base module 325.

The updates may be updates of the OS, the secured application of the edge node, and/or the data files.

According to another embodiment, not illustrated, each isolated area may be split into two parts, the first part comprising the OS, the secured application, the accepted update/chain of accepted updates and the data file, and the second part of the isolated area comprising any new updates and any new pending data.

A golden image, from which the isolated area is periodically rebooted to remove possible corruption, includes the OS, the secured application of the edge node, the accepted update/chain of accepted updates, and the data file. Any new updates and any new pending data, which have not yet been successfully installed, do not form part of the golden image for the isolated area. Once a new update has been successfully installed, the new update forms part of the accepted update/chain of accepted updates, and the new data may form part of the data file. The golden image, which will be discussed in further detail below, may be constructed either off-platform by a trusted external source, or on-platform in a trusted execution environment (either a TEE or an equivalently secure isolated environment).

The proxy node 321 also comprises a communication module 330 enabling communication with the edge nodes, an intrusion detector module 326, a supervisor module 327, such as a hypervisor instantiated as a microvisor, a trusted execution environment module (TEE) 328 and a Hardware Root Of Trust (HW RoT) 329. As known in the art a proxy node may comprise other modules that are not illustrated for ease of understanding. Some modules may be realized in hardware as accelerators in which case the modules contain their device drivers. In other cases, there modules are realized as software.

For the avoidance of doubt, the appropriate combinations of firmware and software, including operating system, networking connectivity, and applications software, will henceforth be referred to as software.

Figure 4A:
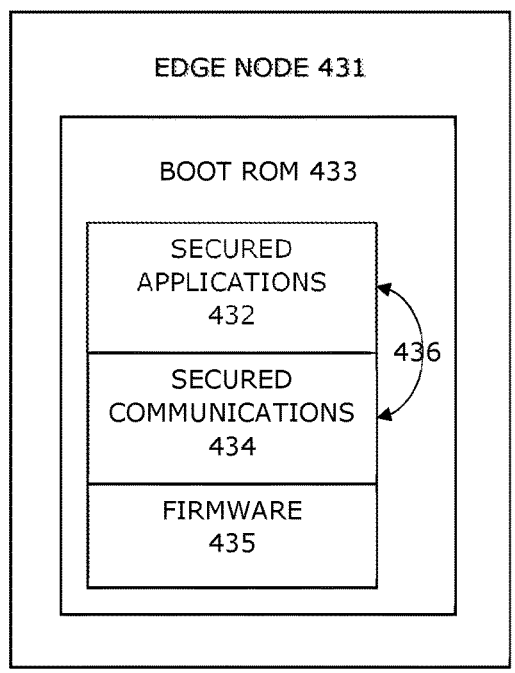
FIG. 4A illustrates schematically an edge node.

FIG. 4A schematically illustrates one embodiment of an edge node when first provisioned in a network. The edge node 431 comprises a secured applications module 432, a secured communications module 434 and a firmware module 435.

The edge node software of FIG. 4A is modularly packaged so that it can be split into two parts: static/fixed secure communications software and dynamic/moveable secured applications software. When an edge node of this type is first provisioned in a network, the secure communications software is stored in the secured communications module 434 and the secured applications software is stored in secured applications module 432, such that the secure communications software and the secured applications software are separately stored in the bootROM 433 at the edge node. The secured applications software is dynamically linked to the secure communications software, as illustrated by the arrow 436 in FIG. 4A. The secured applications module 432 may be compiled to portable byte codes that can run either on the edge nodes or in an isolated area at the proxy node, or the secured applications module 432 may bundle binaries for multiple platform architectures.

The secure communications software provides secure communications to a proxy node.

Following delegation of the edge nodes application, security and update functions to a proxy node, the secured applications software may be disconnected at the edge node and replaced with a variant of the secured applications software run at the proxy node. The link between the secured applications software and the secure communications software is maintained, such that the secured applications software at the proxy node is dynamically linked to the secure communications software at the edge node. According to one embodiment, a container, such as a secured applications module 432 provided at an edge node, stores the initial OS and secured application. Following delegation of the edge nodes application, security and update functions to a proxy node, the OS and secured application is migrated from the edge node to the proxy nodes isolated area (for example, a virtual machine). The OS and secured application may be migrated as either as an entire virtual machine, or as just the OS and application.

According to one embodiment, the dynamic/moveable secured applications software is not moved to the proxy node, until an update is required at the edge node. The edge node pairs with a proxy node, such that the edge node is communicatively coupled with the proxy node and all communications to and from the edge node go through the proxy, however the edge node does not delegate its applications, security and update functions to the proxy node until required. According to another embodiment, the dynamic/moveable secured applications software is moved to the proxy node following pairing of the edge node with a proxy node.

Figure 4B:
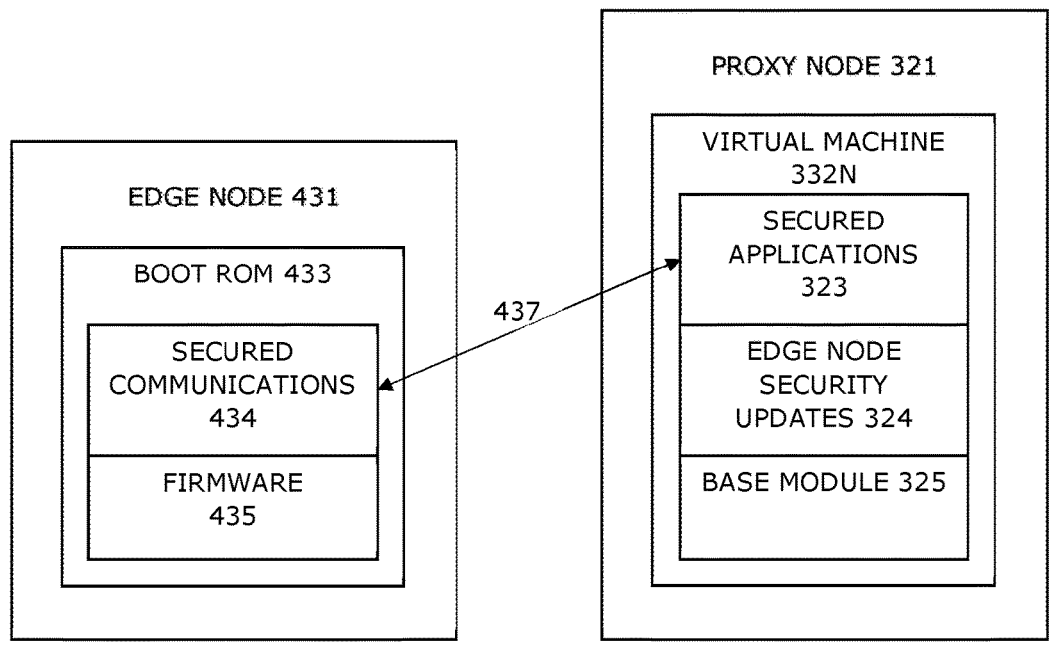
FIG. 4B illustrates schematically another edge node.

FIG. 4B illustrates another embodiment of an edge node when first provisioned in a network. The edge node 431 of FIG. 4B comprises a secured communications module 434 and a firmware module 435, however, the edge node 431 is not provided with a secured applications module. This is because in this embodiment, the secured applications software is not provided at the edge node, the secured applications software is provided at the proxy node. The secured applications software for the edge node may either be downloaded to the proxy node following pairing of the edge node with the proxy node, or a copy of the secured applications software for the edge node may already be installed at the proxy node as a result of prior installation following pairing of the proxy node with a different edge node of the same type. As in the embodiment of FIG. 4A, the secure communications software is stored in the secured communications module 434 at the edge node 431. In addition, the secured applications software provided at the proxy node is dynamically linked to the fixed secure communications software provided at the edge node, as illustrated by the arrow 437 in FIG. 4B.

Following pairing of the edge node with a proxy node, for example, following authentication of the edge node and the proxy node, a secure communication channel may be initiated between the edge node and the proxy node. In addition, a secure isolated area (for example, a virtual machine) may be created at the proxy node. A message may be sent from the edge node to the proxy nodes hypervisor or virtual machine boot environment describing where to find the OS and secure application software to install (for example, an HTTPS address in a URL). The secure communications software provides secure communications to a proxy node.

In known systems the secured applications software and the secured communications software are both static/fixed at the edge node.

Following installation of the edge node in the network, the edge node authenticates with a proxy node, such that it is capable of secure communication with the proxy node. For example, a secure communication channel may be initiated between the edge node and proxy node after authentication keys have been established.

In order to function as a proxy node for the edge node, a proxy node should be within communication range of the edge node and should be capable of providing the security and update functions for the edge node. When more than one proxy node could function as the proxy node for an edge node, then the closest proxy node, in terms physically distance to the edge node, is selected as the default proxy node, in order to minimize network latency and power in the wireless case. According to another embodiment, when more than one proxy node could function as the proxy node for an edge node, then the proxy node having the greatest capacity, in terms of power, computational resources, and/or storage/memory, is selected as the default proxy node. According to another embodiment, when more than one proxy node could function as the proxy node for an edge node, then the proxy node which is already performing the security and update functions for at least one other edge node of the same type is selected as the default proxy node. According to yet another embodiment, when more than one proxy node could function as the proxy node for an edge node, then the proxy node having the largest available network capacity is selected as the default proxy node in order to balance the load across the proxy nodes. According to another embodiment, an edge nodes application, security and update functions may be migrated from a proxy node which is functioning as the default proxy node to another proxy node which is already supporting a particular update type, thereby balancing the load across the proxy nodes, consolidating the, applications, security and update functions and providing greater efficiency.

According to one embodiment, the edge node discovers and connects to the proxy node. According to another embodiment, the proxy node detects when a new edge node has been added to the network and connects to the edge node. The edge node and the proxy node are paired using known mutual authorisation techniques and a security association is established between them as part of an authentication process that is followed by a configuration process. The configuration process is not required to immediately follow the provisioning process and may occur at a later stage. For example, an edge node may pair with a proxy node (the provisioning process) but may not delegate its applications, security and update functions to the proxy node until required, at which point the configuration process is initiated.

Figure 5:
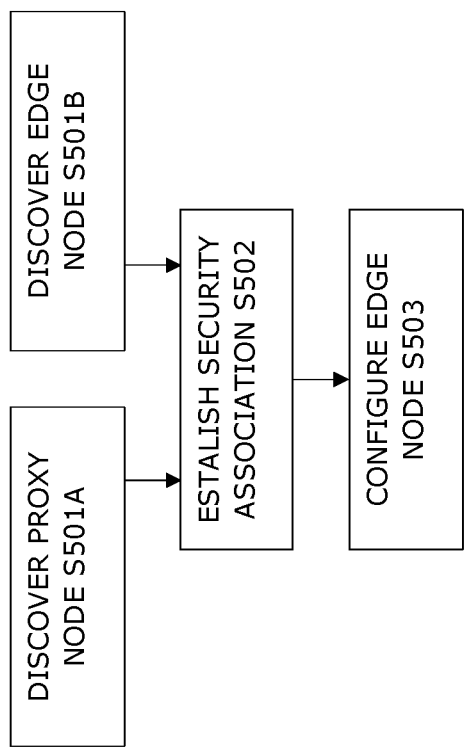
FIG. 5 illustrates a process flow diagram for pairing an edge node with a proxy node.

FIG. 5 illustrates a process flow diagram for connecting an edge node with a proxy node. At step S501A the edge node discovers a proxy node. Alternatively, at step S501B the proxy node discovers an edge node.

At step S502 a security association is established between the edge node and the proxy node, pairing the edge node and the proxy node. For example, an authentication process, such as exchanging public keys from device-specific public/private key pairs, may be performed to establish mutual trust. Edge nodes that are not capable of generating their own keys (for example, because of a constrained energy budget or a lack of a random number generator), may rely upon the proxy node for key generation. According to one embodiment, a protocol may be run to establish the provenance of the edge node and/or the proxy node before the authentication process is performed, to facilitate future secure communications. The authentication process may occur out-of-band, i.e. not using the same channel as will be used for application data. For example, the edge node and the proxy node may use a wired, a local audio, or an optical connection to complete the authentication process, and use a wireless connection for application data following completion of the authentication process. The authentication process enables future authentication and authorization of information/data exchanged between the edge node and the proxy node. The authentication process may include the exchange of shared secrets to optimize efficient encryption. The application data may be the migration or copying of the secured applications software from the edge node to the proxy nodes, as well as actual data from the edge node, depending on the function of the edge node. For example, an edge node that functions as a temperature sensor may transfer temperature readings, its application data, to the proxy node.

At step S503 the edge nodes behaviour is configured, such as how often the edge node is to be activated, when and how often the edge node is required to contact the proxy node etc.

As known in the art, bootROM is a small piece of read/execute only memory (ROM) or write-protected flash embedded inside a device. The bootROM contains the very first code that is executed by the device at power-on or reset. Each edge node is provided with a bootROM, such that when activated, the edge node is returned to its known initial default state and any corruptions that have appeared at the edge node since the last bootROM are removed.

In virtualized and container-based systems, the analogous model of bootROM is the golden image. The golden image is special trusted software that is signed by the originating party, and in some circumstances the testing party as well, and attested to match a signature. The golden image is by design incorruptible as protected read/execute-only code. It is common practice in virtualized data centres to periodically reboot a running virtual machine from its golden image to remove possible corruption that might have targeted the virtual machine components since the golden image was last activated.

At an edge node, reboot is from a device image that is recorded in bootROM. During operation of a "perfect" edge node, reboots occur periodically, at a random frequency. A "perfect" edge node is an edge node that is able to tolerate random reboots. However, some edge nodes that are running mission critical or safety critical applications may not be able to tolerate random reboots and instead require scheduled reboots. A "specific window" edge node is an edge node running an application that expects data within a specific window in time and not at other times. During operation of a "specific window" edge node, reboots occur randomly, but at times outside the data exchange windows, when the application can tolerate it. A "real time" edge node is an edge node running an application which requires continuous data streams, and therefore reboots are only tolerated as scheduled (typically maintenance) events. In each of these three cases the applications are node specific, and are not dependent upon coordinating data drawn from multiple other nodes. One of the three labels should be included as part of the bootROM metadata to inform the edge node about its expected reboot behaviour.

With reference to FIG. 4A, where both the secured communications software and the secured applications software are provided at the edge node, both the secure communications software and the secured applications software are signed and are part of a secure bootROM procedure for the edge node. The edge nodes device image, which is captured in bootROM, is split into two parts, communications and applications, with both parts being write-once (at manufacturing time) and read/execute-many thereafter.

When a reboot occurs at the edge node of FIG. 4A, the edge node cycles through the first part of the bootROM, the secure communication part, followed by the second part of the bootROM, the secure application part.

When a reboot occurs at the edge node of FIG. 4B or the edge node of FIG. 4A following delegation of the edge nodes application, security and update functions to a proxy node, such that the edge nodes secured applications software is provided at the proxy node, then the edge node cycles through the first part the bootROM, the secure communication part, but this is not followed by the secure application part of the bootROM. The reboot of the secured applications software is performed at the proxy node from the golden image.

At a proxy node, a reboot is from a golden image. As discussed above, the golden image from which the isolated area of the proxy node is rebooted, includes the OS, the secured application of the edge node, the accepted update/chain of accepted updates, and the data file. Essentially, the OS, the secured application of the edge node, and the accepted update/chain of accepted updates define the minimal resettable state of the isolated area while the data files contain any necessary information to re-establish secure stateful communications as well as any data gathered from the edge node up until that point in time. The golden image may be marked by the OS as read/execute-only, but it may be replaced, modified or otherwise updated by an appropriately privileged party.

According to one embodiment, the golden image may include the secured application of the edge node, the accepted update/chain of accepted updates, and the data file.

A given security or application update is only complete when it has propagated to all nodes, both the edge nodes and the proxy node to which the edge nodes have delegated their application, security and update functions. The security or application update is received at the proxy node and installed in the isolated area. The proxy node then triggers a reboot of the required edge node by issuing a securely protected authenticated signal. The edge nodes confirm receipt of this signal and reboot according to a fixed schedule or randomly, as required by the edge node and depending upon hints provided with the signal from the proxy node. Alternatively, the edge nodes bootROM can have a specific autonomous behaviour configured for them to follow independently. When all edge nodes signal back to the proxy node that they have updated successfully, the proxy node then reboots and the update transaction is complete. However, when one or more of the messages from the edge nodes to the proxy node or from the proxy node to one or more of the edge nodes does not arrive, especially after retries within a relatively short time interval, then the transaction is aborted and a message is sent back to the source of the update that the update has failed (and a new stable one is still needed). Effectively, an update is a distributed transaction that uses conventional mechanisms to create a consistent state across the nodes.

When an isolated area of a proxy node is paired with only one edge node, then the installation of the update, the reboot of the edge node and the reboot of the proxy node is effectively synchronised.

However, the reboot behaviour of the proxy node is more complicated when an isolated area of a proxy node is paired with and supports more than one edge node. When a proxy node is running a plurality of edge nodes' application and security updates, the accumulated time to reboot a number of edge nodes scattered randomly in time can be quite different from the time for the proxy node to reboot itself. The proxy can count the number of edge nodes it supports and learn the reboot times (e.g. communications lost until communications regained) of the edge nodes to determine when it can reboot. The proxy node should reboot after all the edge nodes have rebooted. An update or application for a "specific window" edge node may provide a hint to the proxy node that a delay is required to assure that all the edge nodes are given enough time to collect their data before a reboot. In addition, an update or application for a "real time" edge node may provide a hint to the proxy node that it is to wait for a scheduled synchronized reboot (so that all the edge nodes reboot while the proxy node is rebooting).

Therefore, the type of reboot which can be tolerated by the edge node should be tagged in the metadata to provide a hint for the reboot behaviour to the proxy node.

When a proxy node comprises a plurality of isolated areas, each isolated area may reboot, as required, which may be at the same time, or at a different time from the other isolated areas of that proxy node.

Figure 6A:
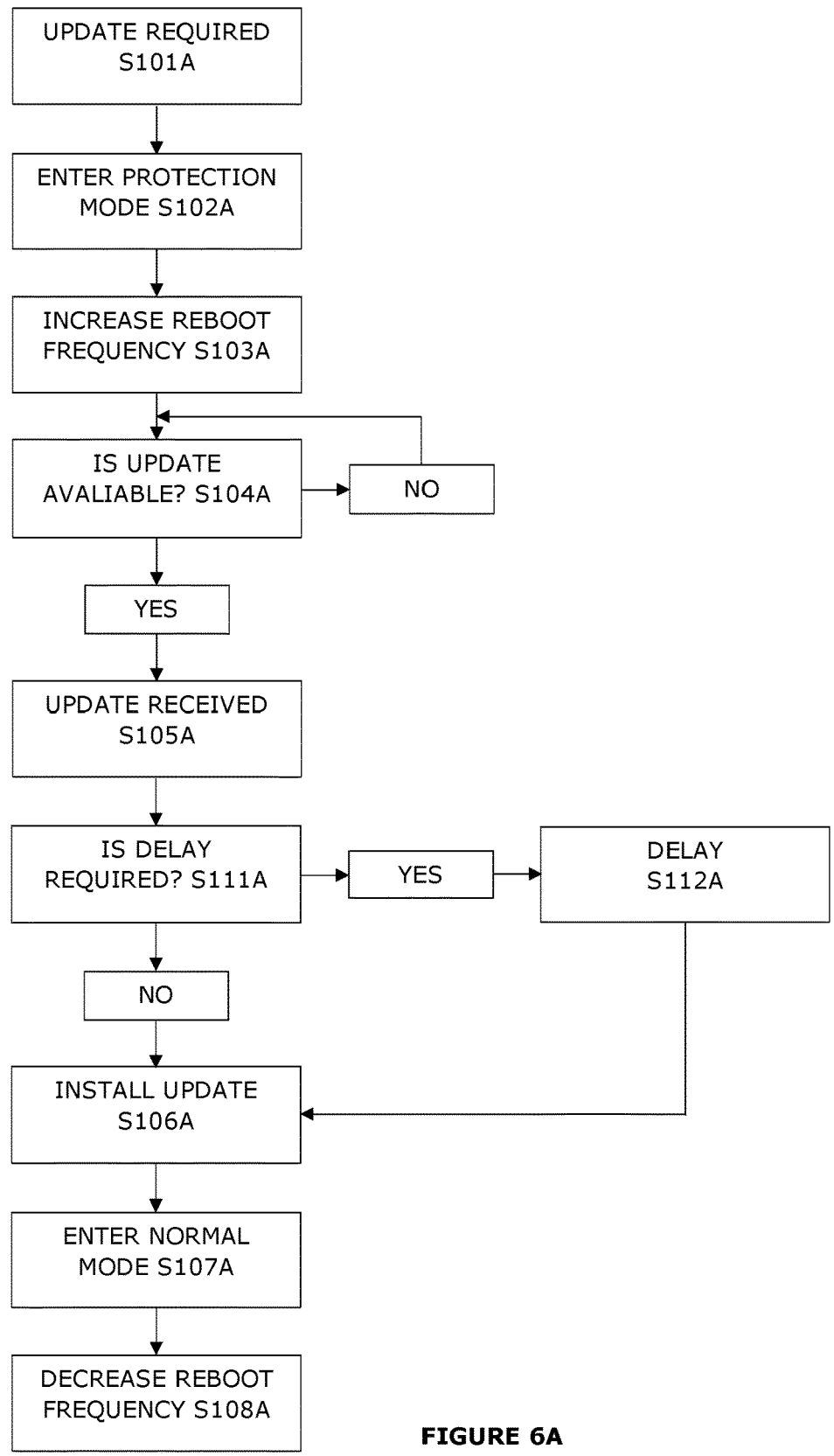
FIG. 6A illustrates a process flow diagram for protecting an edge node.

FIG. 6A illustrates a process flow diagram for protecting an edge node. As described above with reference to FIG. 5, the edge node is paired with a proxy node. In addition, the edge node has delegated its applications, security and update functions to that proxy node during the configuration process, such that the edge nodes secured applications software is provided in an isolated area associated with the edge node at the proxy node. At step S101A it is determined that an update is required or has been published as available. According to one embodiment, at step S101A, a threat may be detected which results in the determination that an update is required. According to another embodiment, at step S101A, vulnerability may be detected, which results in the determination that an update is required. According to one embodiment, the threat or vulnerability is detected by a third party and notification of the threat or vulnerability is sent to the proxy node. For example, security proxies may cooperate with security monitors to detect misbehaviours in the edge nodes they are guarding. The security monitors may take the form of a firewall, Intrusion Detection System, Intrusion Prevention System etc. running inside a separate virtual machine and feeding warning messages to the proxy nodes. When unexpected behaviours are observed, or vulnerabilities in the edge nodes they are guarding reported, then the security proxies notify the proxy nodes. According to another embodiment, the proxy node may itself detect the threat or vulnerability.

Prior to step S101A, the edge node and the proxy node are in normal mode. In normal mode, reboots at the edge node, from bootROM, occur periodically, either at a random frequency or at a scheduled frequency, as required by the edge node, and reboots at the proxy node, from a golden image, occur periodically either at a random frequency or at a scheduled frequency, as required by the edge node. In normal mode, the reboots at the edge node and the proxy node which occur at a random frequency do not happen at the same time (unless coincidently). However, when an edge node requires reboots at a scheduled frequency, then the reboots at the edge node and the proxy node may happen at substantially the same time.

At step S102A, following detection of a threat or vulnerability, the subsystem of proxy node and edge node(s) shifts from normal mode to protection mode while it waits for an update to be delivered. According to one embodiment, the subsystem of proxy node and edge node(s) shifts from normal mode to protection mode at the same time. The subsystem refers to the edge nodes affected by the threat or vulnerability, and the isolated area(s) of the proxy node associated with the affected edges nodes. As stated above, the proxy node may be communicatively coupled to a plurality of edge nodes. Therefore, only the edge nodes that require the update shift from normal mode to protection mode. The unaffected edge nodes remain in normal mode. Furthermore, only the isolated area(s) of the proxy node associated with the affected edges nodes shift from normal mode to protection mode. The unaffected isolated area(s) of the proxy node remain in normal mode. For example, with reference to FIG. 2, when it is determined that an update is required for the edge nodes 202A, 202B, 202C, . . . , 202N, then the subsystem which switches from normal mode to protection mode comprises the edge nodes 202A, 202B, 202C, . . . , 202N and the associated isolated area 222B of the proxy node. The other edge nodes 201, 203, 204 and other isolated areas 222A, 222BC, . . . 222N remain in normal mode.

In protection mode, at step S103A, the frequency of the reboots is increased. In protection mode, the reboot frequency of each of the affected edge nodes is increased and the reboot frequency of the associated isolated area(s) of the proxy node is increased. The proxy node instructs the edge node to increase its reboot frequency. The reboot frequency is increased to a rate that can be tolerated by the edge nodes constraints, such as the edge nodes energy budgets and reboot requirements. For example, for "specific window" edge nodes, a reboot requirement is that the reboots should occur outside the data exchange windows, and for "real time" edge nodes a reboot requirement is that the reboots should occur at scheduled times. The reboot frequency for "specific window" edge nodes may be increased as long as the reboots still occur outside the data exchange windows. In addition, the reboot frequency for "real time" edge nodes may be increased as long as the reboots occur at scheduled times.

In protection mode, the reboots at the affected edge nodes is from bootROM running on the edge node, and the reboots at the associated isolated area(s) of the proxy node is from the golden image of the associated isolated area running at the proxy node. The golden image is simply a file, which may be marked by the OS as read/execute-only. However, the golden image may be replaced and/or modified by an appropriately privileged party with an updated golden image. The edge node cycles through the first (secure communications) part of the bootROM, and the proxy node reboots the golden image.

The increase in reboot frequency should disrupt any attack, since frequent reboots complicate the ability of malicious parties to insert their malware, as well as helping provide sufficient time for an update to be located, or created if one does not yet exist, to address the threat or vulnerability.

At step S104A it is determined whether an update that addresses the detected threat or vulnerability is available. When an update is not available, then the affected edge nodes and the proxy node remain in protection mode, having an increased reboot frequency. When an update is available, either because an update has been located, or because an update has been engineered and qualified for distribution, then the update is received at the proxy node at step S105A. The process moves to step S111A, where it is determined whether a delay is required. As stated above, some edge nodes which have mission critical or safety critical applications, may not tolerate random reboots and instead require reboots to occur outside data exchange windows or at scheduled times. When the application requires a delay because the reboots should occur outside data exchange windows or at scheduled times, then the process moves to step S112A. At step S112A a delay is introduced that enables the application to checkpoint/wait for the data exchange window to end/wait for the scheduled time. The process then moves to step S106A. Alternatively, when the application does not require a delay, then the process moves directly to step S106A. At step S106A the update is installed and at step S107A, following successful installation of an update that addresses the detected threat or vulnerability, the affected edge nodes and the associated isolated area(s) of the proxy node return to normal mode. In normal mode, the reboot frequency at the edge node and the reboot frequency the proxy node is decreased at step S108A. According to one embodiment, the reboot frequency at an edge node in normal mode can be as low as zero, as may be required by mission critical or safety critical applications.

Figure 6B:
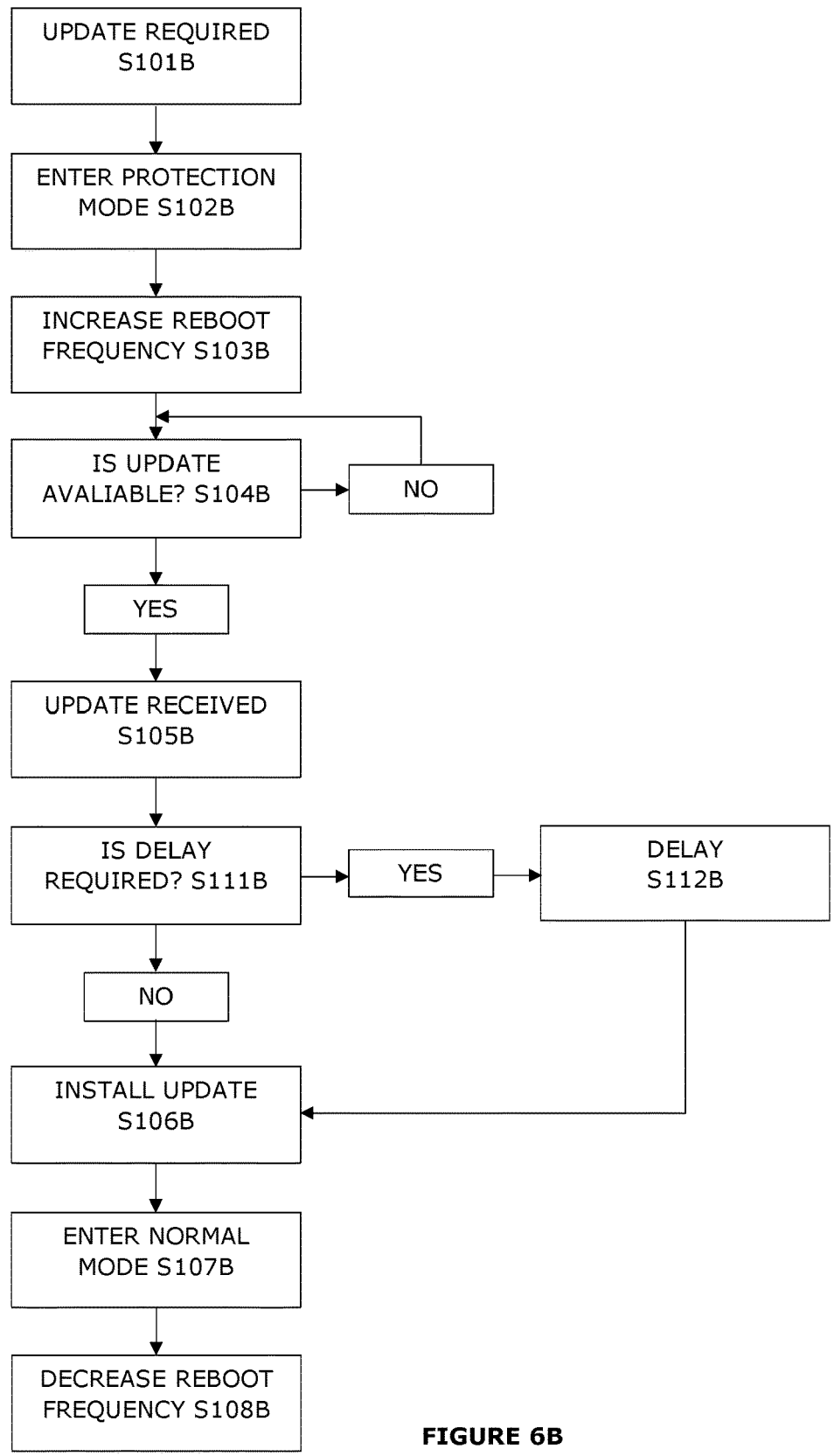
FIG. 6B illustrates another process flow diagram for protecting an edge node.

FIG. 6B illustrates a process flow diagram for protecting an edge node. As described above with reference to FIG. 5, the edge node is paired with a proxy node. However, the edge node has not yet delegated its security and update functions to that proxy node, such that the edge nodes secured applications software is still provided at the edge node as illustrated in FIG. 4A. The difference between FIG. 6A and FIG. 6B is that an isolated area of the proxy node has not yet been associated with the affected edge node.

At step S101B it is determined that an update is required or has been published as available. According to one embodiment, at step S101B, a threat may be detected which results in the determination that an update is required. According to another embodiment, at step S101B, vulnerability may be detected, which results in the determination that an update is required. According to one embodiment, the threat or vulnerability is detected by a third party and notification of the threat or vulnerability is sent to the proxy node. For example, security proxies may cooperate with security monitors to detect misbehaviours in in the edge nodes they are guarding. The security monitors may take the form of a firewall, Intrusion Detection System, Intrusion Prevention System etc. running inside a separate virtual machine and feeding warning messages to the proxy nodes. When unexpected behaviours are observed, or vulnerabilities in the edge nodes they're guarding reported, then the security proxies notify the proxy nodes. According to another embodiment, the proxy node may itself detect the threat or vulnerability.

Prior to step S101B, the edge node and the proxy node are in normal mode. In normal mode, reboots at the edge node, from bootROM, occur periodically, either at a random frequency, or at a scheduled frequency, as required by the edge node. In normal mode, the reboots at the edge node and the proxy node which occur at a random frequency do not happen at the same time (unless coincidently). However, when an edge node requires reboots at a scheduled frequency, then the reboots at the edge node and the proxy node may happen at substantially the same time.

At step S102B, following detection of a threat or vulnerability, the edge node(s) affected by the threat or vulnerability shifts from normal mode to protection mode while it waits for an update to be delivered. The proxy node instructs the edge node to shifts from normal mode to protection mode. As stated above, the proxy node may be communicatively coupled to a plurality of edge nodes. Therefore, only the edge nodes which are affected by the detected threat or vulnerability shift from normal mode to protection mode. According to one embodiment, the proxy node and edge node(s) shifts from normal mode to protection mode at the same time. The unaffected edge nodes remain in normal mode.

In protection mode, at step S103B, the reboot frequency of each of the affected edge nodes is increased. The reboot frequency is increased to a rate that can be tolerated by the edge nodes' constraints such as the edge nodes energy budgets and reboot requirements. For example, for "specific window" edge nodes, a reboot requirement is that the reboots should occur outside the data exchange windows, and for "real time" edge nodes a reboot requirement is that the reboots should occur at scheduled times.

In protection mode, the reboots at the affected edge nodes is from bootROM running on the edge node. The edge node cycles through the first part of the bootROM, the secure communication part, followed by the second part of the bootROM, the secure application part.

At step S104B it is determined whether an update, which addresses the detected threat or vulnerability, is available. When an update is not available, then the affected edge nodes remain in protection mode, having an increased reboot frequency. When an update is available, either because an update has been located, or because an update has been engineered and qualified for distribution, then the update is received at the proxy node at step S105B. The process moves to step S111B, where it is determined whether a delay is required. As stated above, some edge nodes that have mission critical or safety critical applications may not tolerate random reboots and instead require reboots to occur outside data exchange windows or at scheduled times. When the application requires a delay because the reboots should occur outside data exchange windows or at scheduled times, then the process moves to step S112B. At step S112B a delay is introduced that enables the application to checkpoint/wait for the data exchange window to end/wait for the scheduled time. The process then moves to step S106B. Alternatively, when the application does not require a delay, the process moves directly to step S106B. At step S106B the update is installed and at step S107B, following successful installation of an update that addresses the detected threat or vulnerability, the affected edge nodes return to normal mode. In normal mode, the reboot frequency at the edge node is decreased at step S108B. According to one embodiment, the reboot frequency at the edge node in normal mode can be as low as zero, as may be required by mission critical or safety critical applications.

Figure 7A:
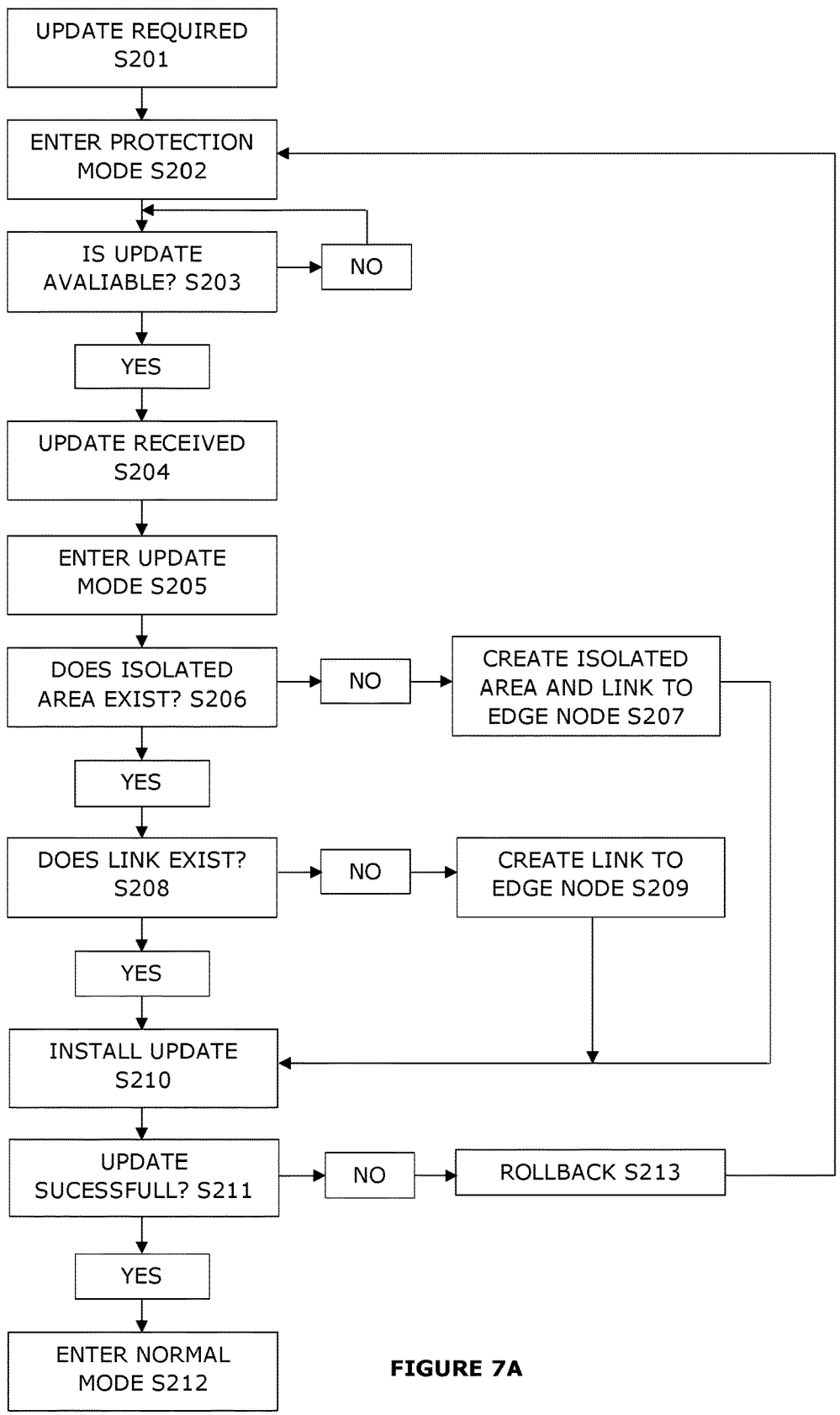
FIG. 7A illustrates a process flow diagram for installing updates.

FIG. 7A illustrates the process of installing updates in more detail. In FIG. 7A, steps S201 of determining that an update is required and step S202 of entering protection mode, are the same as steps S101A/B and S102 A/B described above with reference to FIGS. 6A and 6B. At step S203, it is determined whether an update is available. When an update is not available, then the affected edge nodes and the proxy node remain in protection mode, as discussed above with reference to FIGS. 6A and 6B until an update becomes available.

When an update that addresses the detected threat or vulnerability becomes available, either because an update has been located, or because an update has been engineered and qualified for distribution, it is received at the proxy node at step S204.

According to one embodiment, the proxy node looks to a preconfigured watch list source for a copy of an update application that it can run. The proxy node may be provisioned with the location of one or more repositories (in a cloud or in a local cache) that it can poll for availability and delivery of updates. Alternatively, or in addition, the proxy node can wait until a repository broadcasts a message that an update is available.

Upon arrival of the update at the proxy node, the affected edge nodes and the proxy node shift from protection mode to update mode at step S205. According to one embodiment, the subsystem of proxy node and edge node(s) shifts from protection mode to update mode at the same time. In update mode, the reboot frequency of each of the affected edge nodes and the reboot frequency of the associated isolated area(s) of the proxy node, when an isolated area has already been associated with the edge node, may be lowered to simplify installation of the update. According to another embodiment, in update mode, the reboot frequency of each of the affected edge nodes and the associated isolated area(s) of the proxy node may not need to be lowered for the update to be installed.

The affected edge nodes, and the associated isolated area(s) of the proxy node, when an isolated area has already been associated with the edge node, are sent a message by the proxy nodes to switch from protection mode to update mode.

The table below provides non-limiting examples of the different modes reboot frequencies f.

| MODE | REBOOT FREQUNCY | SYNCHRONISED? |
| --- | --- | --- |
| Normal Mode | f = 1 | NO |
| Protection Mode | f = 10 | YES |
| Update Mode | f = 5 | YES |

At step S206, it is determined whether an isolated area, for the affected edge nodes, exists at the proxy node. When an isolated area does already exist at the proxy node, such that the edge nodes secured applications software is provided at the proxy node, then the process moves to step S208. At S208 it is determined whether a link to the isolated area exists. For example, when an isolated area does exist at the proxy node for the type of edge node, such that the secured applications software for the edge node is already provided at the proxy node but the secured applications software provided at the proxy node is not yet dynamically linked to the fixed secure communications software provided at the edge node, then the link is created at step S209. According to one embodiment, a copy of the secured applications software for the edge node may already be installed at the proxy node as a result of prior installation following pairing of the proxy node with a different edge node of the same type. According to another embodiment, the secured applications software for the edge node may have been downloaded from a third party to the proxy node. However, the secured applications software has not yet been dynamically linked to the edge node.

When a link to the isolated area exists, or following creation of the link at step S209, then the process moves to step S210. At step S210, the update is installed in the isolated area. According to one embodiment, the update is installed into the edge node security update module 324 provided at the isolated area. The update may include any local compilation and provisioning required for the edge node.

According to one embodiment, the update comprises an entire updated golden image that has been attested to match a trusted signature. The updated golden image is installed at the proxy node, and the isolated area of the proxy node is rebooted from the updated golden image. According to another embodiment, the update comprises an addition or modification to the existing golden image. The update is patched into or linked with the existing golden image to create a patched golden image at the proxy node. The isolated area of the proxy node is rebooted from the patched golden image.

Following installation of the update, at step S210, it is determined whether the update has been successful at step S211. When the update has been successfully completed, then the subsystem of affected edge nodes and the associated isolated area(s) of the proxy node switch back to normal mode at step S212. According to one embodiment, the proxy node and edge node(s) shifts from update mode to normal mode at the same time. In normal mode, the reboot frequency at the edge node and the proxy node is decreased to the normal frequency.

When the update has not been successfully completed, it has failed, then the subsystem of affected edge nodes and the associated isolated area(s) of the proxy node rollback at step S213, to the original software prior to installation of the update, and switch back to protection mode at step S202. In protection mode, the reboot frequency at the edge node and the proxy node is increased to the protection frequency tolerated by the edge node. In addition, the proxy node informs the upstream system, for example the repository from which the update was received, of the failure and requests a new update.

When it is determined at step S206, that an isolated area, for the affected edge nodes does not already exist, such that the edge nodes secured applications software is not yet provided at the proxy node, then the process moves to step S207. At step S207, an isolated area is provided and linked to the affected edge node(s).

Figure 7B:
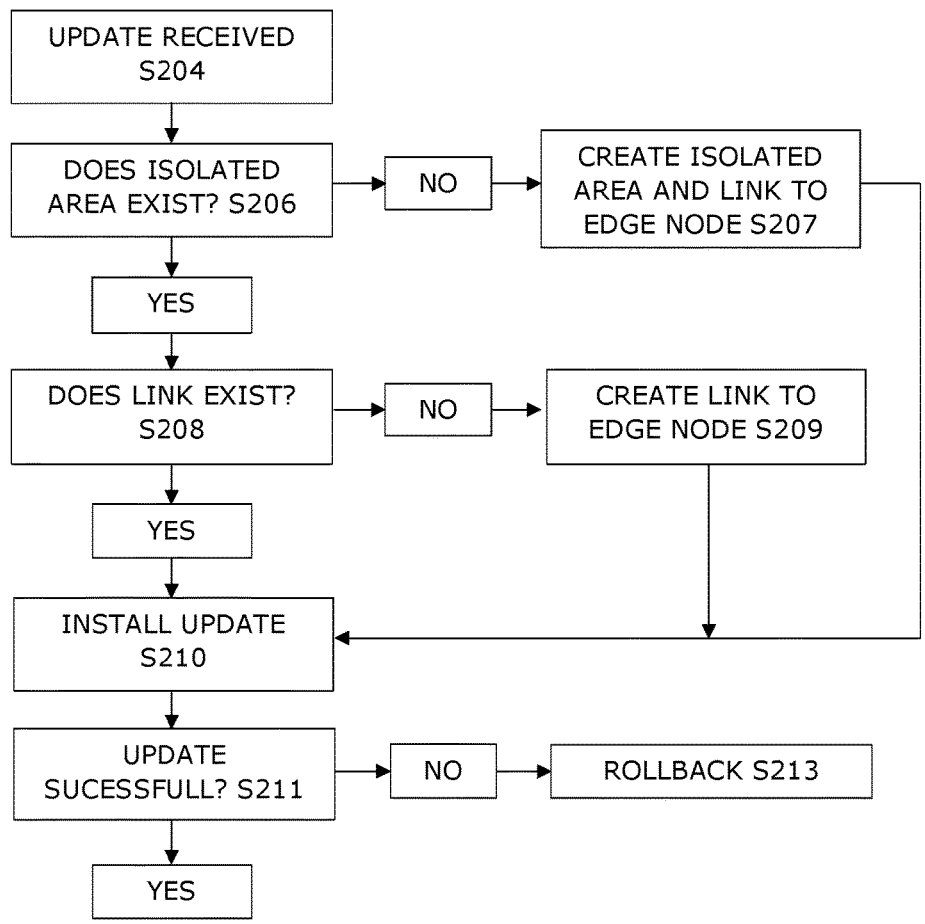
FIG. 7B illustrates another process flow diagram for installing updates.

FIG. 7B illustrates another process of installing updates. In FIG. 7B, steps S204, S206 to S211 and S13 are the same as the corresponding steps described above with reference to FIG. 7A. However, in FIG. 7B, the subsystem of affected edge nodes and the associated isolated area(s) of the proxy node are not required to enter a protection mode, having an increased reboot frequency prior to installing an update.

In FIG. 7B, when an update becomes available for the affected edge nodes, either because an update has been located, or because an update has been engineered and qualified for distribution, it is received at the proxy node at step S204. At step S206, it is determined whether an isolated area, for the affected edge nodes, exists at the proxy node. When an isolated area does already exist at the proxy node, such that the edge nodes secured applications software is provided at the proxy node, then the process moves to step S208. At step S208 it is determined whether a link to the isolated area exists. For example, when an isolated area does exist at the proxy node for the type of edge node, such that the secured applications software for the edge node is already provided at the proxy node but the secured applications software provided at the proxy node is not yet dynamically linked to the fixed secure communications software provided at the edge node, then the link is created at step S209. According to one embodiment, a copy of the secured applications software for the edge node may already be installed at the proxy node as a result of prior installation following pairing of the proxy node with a different edge node of the same type. According to another embodiment, the secured applications software for the edge node may have been downloaded from a third party to the proxy node. However, the secured applications software has not yet been dynamically linked to the edge node.

When a link to the isolated area exists, or following creation of the link at step S209, then the process moves to step S210. At step S210, the update is installed in the isolated area. According to one embodiment, the update is installed into the edge node security update module 324 provided at the isolated area. The update may include any local compilation and provisioning required for the edge node.

According to one embodiment, the update comprises an entire updated golden image that has been attested to match a trusted signature. The updated golden image is installed at the proxy node, and the isolated area of the proxy node is rebooted from the updated golden image. According to another embodiment, the update comprises an addition or modification to the existing golden image. The update is patched into or linked with the existing golden image to create a patched golden image installed at the proxy node. The isolated area of the proxy node is rebooted from the patched golden image.

Following installation of the update, at step S211, it is determined whether the update has been successful. When the update has been successfully completed, then the process of FIG. 7B ends.

When the update has not been successfully completed, it has failed, then the subsystem of affected edge nodes and the associated isolated area(s) of the proxy node rollback at step S213, to the original software prior to installation of the update. In addition, the proxy node informs the upstream system, for example the repository from which the update was received, of the failure and requests a new update.

When it is determined at step S206, that an isolated area, for the affected edge nodes does not already exist, such that the edge nodes secured applications software is not yet provided at the proxy node, then the process moves to step S207. At step S207, an isolated area is provided and linked to the affected edge node(s).

Figure 8:
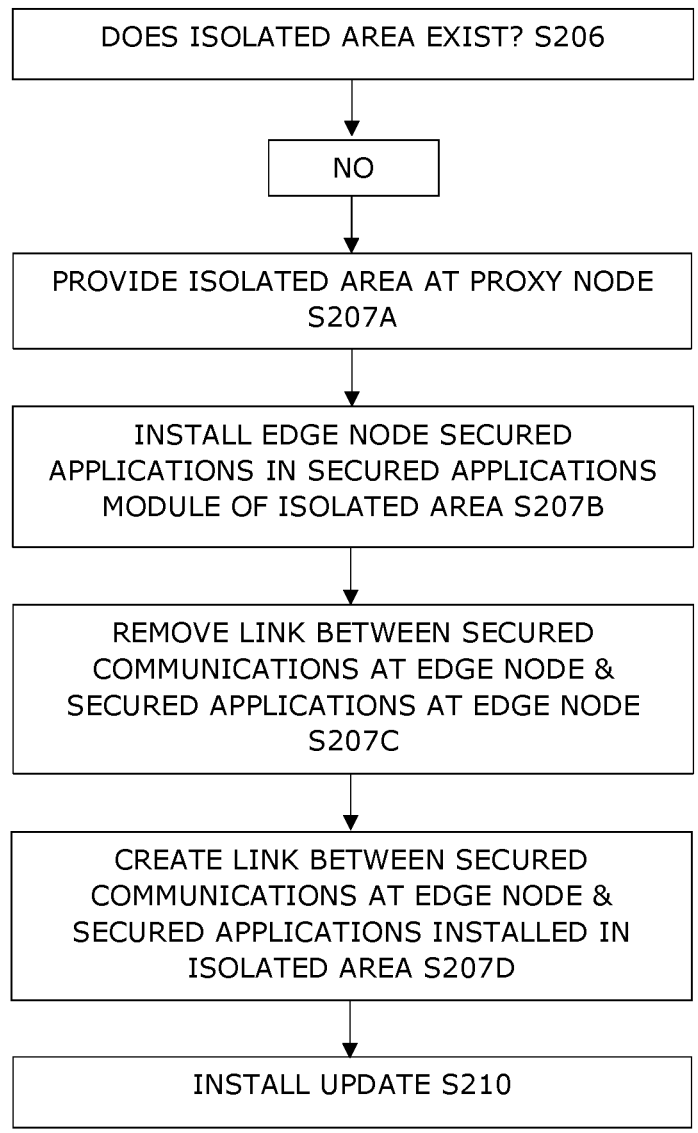
FIG. 8 illustrates a process flow diagram of step S207 of FIGS. 7A and 7B.

FIG. 8 illustrates in further detail the process performed at step S207 of FIG. 7A and FIG. 7B. In FIG. 8, steps S206 of determining whether an isolated area, for the affected edge nodes, exists at the proxy node is the same as step S206 described above with reference to FIG. 7A or FIG. 7B. When an isolated area does not already exist at the proxy node, then the process moves to step S207A. At step S207A an isolated area is provide at the proxy node. According to one embodiment, an isolated area is provided by a management application running either inside the TEE module 328 or in another isolated area running in close cooperation with the TEE module 328 at the proxy node. The isolated area is associated with the edge node.

At step S207B, when the edge node comprises moveable secured applications software, such as described above with reference to FIG. 4A, then the secured applications software is installed in the secured applications module 323 of the isolated area at the proxy node. The edge nodes secured applications software can either be migrated or copied from the secured applications module 423 at the edge node to the secured applications module 323 of the isolated area at the proxy node. According to another embodiment, when the edge node is not provided with secured applications software, such as described above with reference to FIG. 4B, then the secured applications software for the edge node may be downloaded to the proxy node from an external supplier, such as the manufacturer of the edge node or a third party.

At step S207C the connection (arrow 436 of FIG. 4A) between the secure communications software stored at the secure communications module 434 at the edge node and the secured applications software stored at the secured applications module 432 at the edge node is removed. The secured applications software may be disconnected at the edge node, since it has been replaced with a variant of the secured applications software run at the proxy node. When the edge node is not provided with secured applications software, such as described above with reference to FIG. 4B, then step 207C is not required, since there is no secured applications software, at the edge node. At step S207D a remote connection is created between the secure communications software stored at the secure communications module 434 at the edge node and the secured applications software stored at the secured applications module 323 of the isolated area at the proxy node, such as the connection 437 illustrated in FIG. 4B. According to another embodiment, step S207D may happened before Step 207C. According to another embodiment, steps S207C and 5207D may happen simultaneously.

Returning to FIG. 8, the process then moves onto step S210. In FIG. 8, the step S210 of installing the update is the same as step S210 of FIG. 7A and FIG. 7B.

Figure 9:
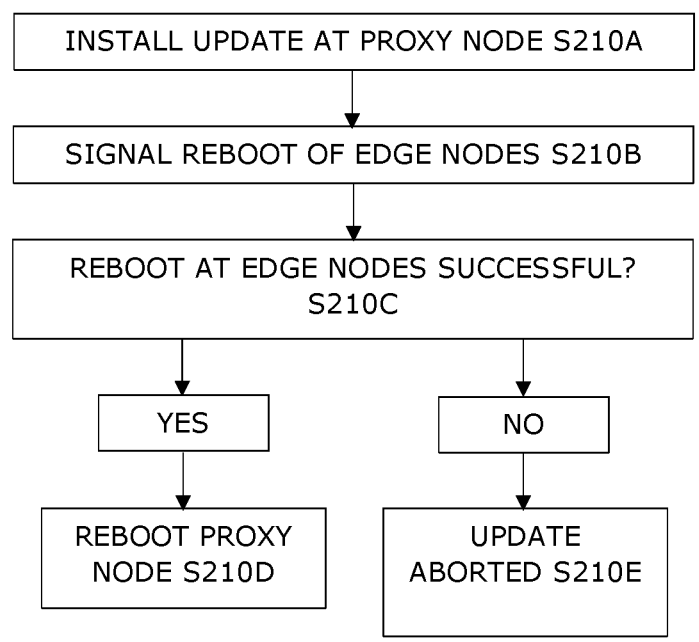
FIG. 9 illustrates a process flow diagram of step S210 of FIGS. 7A, 7B and 8.

FIG. 9 illustrates in further detail the process performed at step S210 of FIGS. 7A, 7B and 8, of installing the update. As discussed above, an update is only complete (and thus successfully installed) when it has propagated to all the nodes, both the edge nodes and the proxy node. At step S210A the update is received at the proxy node and installed in the isolated area of the proxy node. According to one embodiment, the update is installed in edge node security update module 324 provided at the isolated area of the proxy node. According to one embodiment, the update comprises an entire updated golden image that has been attested to match a trusted signature, and the updated golden image is installed at the proxy node. According to another embodiment, the update comprises an addition or modification to the existing golden image, the update is patched into or linked with the existing golden image to create a patched golden image, and the patched golden image is installed at the proxy node.

The proxy node then signals a reboot of the edge node(s) at step S210B. The edge nodes confirm receipt of this signal and reboot according to a fixed schedule or randomly, as required by the edge node. When all the edge nodes have signalled back to the proxy node that they have rebooted successfully at step S210C, then the proxy node reboots at step S210D. However, when one or more of the signals from the edge nodes to the proxy node or from the proxy node to one or more of the edge nodes does not arrive, then the update is aborted at step S210E. A message is sent back to the source of the updates that the update has failed.

The system of proxy nodes and edge nodes may move between normal mode, protection mode and update mode as further vulnerabilities and/or threats are detected. The system of proxy nodes and edge nodes may operate in protection mode indefinitely, if required, for example, when an update is not available, or when an update is not successfully installed.

There may be a plurality of proxy nodes distributed throughout the network, which are communicatively coupled to different edge nodes of the same type. Each proxy node will perform the same process in order to install the update which addresses the detected threat or vulnerability at the edge nodes to which it is communicatively coupled. Therefore, the update is distributed to all of the proxy nodes that require it.

The delegation of the security function from the edge nodes to the proxy nodes enables the edge nodes to be kept as simple, low cost IoT devices, enhancing the viability of simple edge nodes, whilst increasing security at the edge nodes. Increased security at the edge nodes also results in increased security and stability across the entire network.

Conventionally, the use of proxies is not considered to be advantageous because the proxy could be considered a vulnerability point for a man-in-the-middle attack. However, in the case of constrained IoT devices, the proxy is deliberately chosen to have sufficient resources that it can be secured far better than any of the edge nodes that it is protecting. Edge nodes that have the resources to protect themselves do not need to avail themselves of a proxy node.

Figure 10:
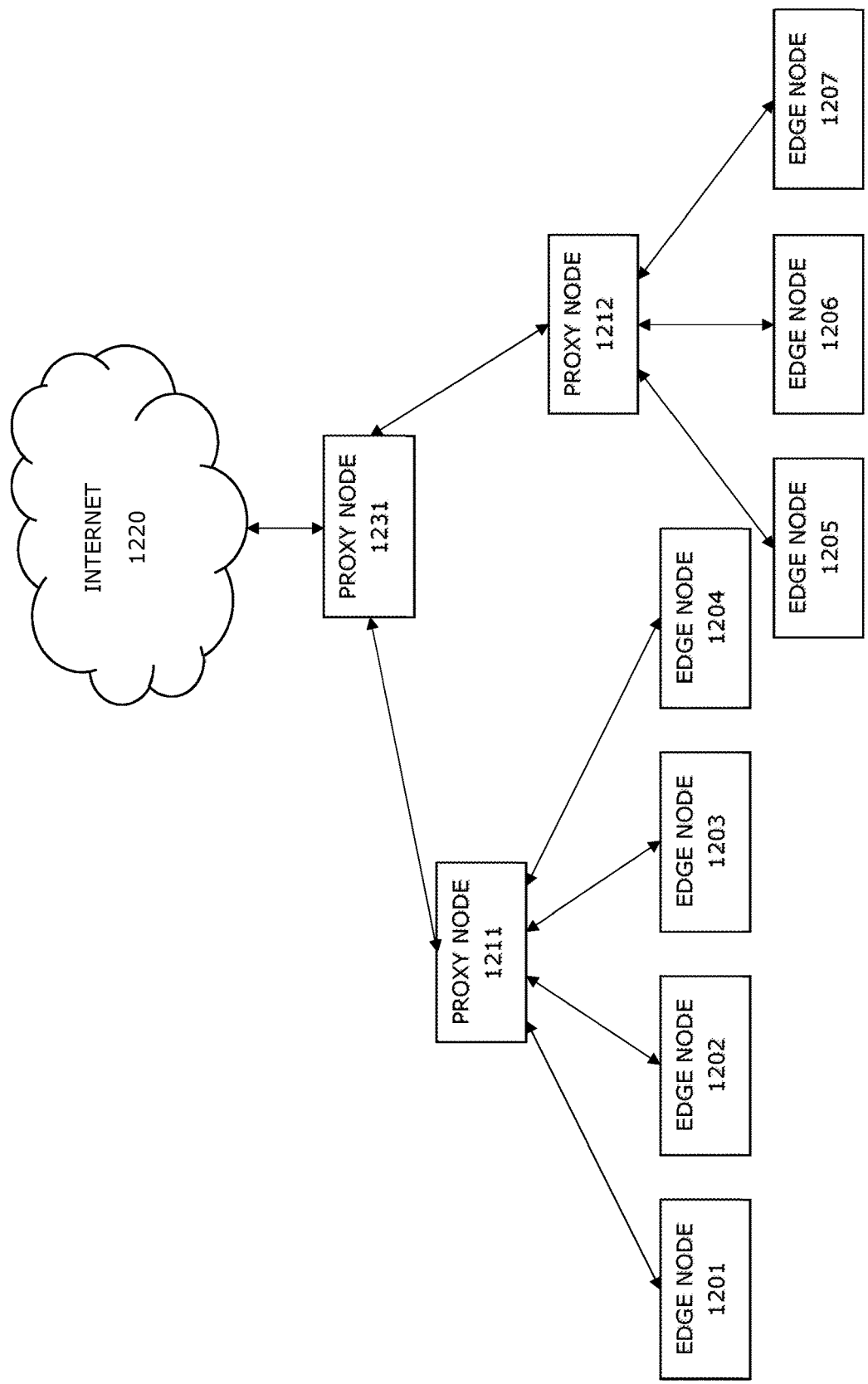
FIG. 10 illustrates schematically another network of connected nodes.

The proxy nodes described above may also be considered as edge nodes in a network having a hierarchy of higher functioning devices. FIG. 10 illustrates a network having a plurality of edge nodes 1201, 1202, 120, 1204 connected to a proxy node 1211, and a plurality of edge nodes 1205, 1206, 1207 connected to a proxy node 1212. The proxy nodes 1211 and 1212 can be considered as edge nodes and themselves be connected to a higher functioning proxy node 1231, the higher functioning proxy node 1231 providing the applications, security functionality and updates for its edge nodes, the proxy nodes 1211 and 1212.

For example, proxy nodes as they become more heavily loaded exhibit resource constraints just like edge nodes did before delegating functions to the proxy. At that point the proxy nodes' limitations make their role in the architecture look like that of a bigger saturated edge node (since the original edge nodes are hidden from the rest of the network there is a new logical edge consisting of the proxy nodes as far as the rest of the network is concerned). When the proxy nodes reach this state of resource utilization, then higher performance and resourced nodes upstream can provide another level of proxy nodes to service the first level of proxy nodes in the same manner as the first level of proxy nodes did for the edge nodes. An example of such an architecture is a consumer home router/access point securing by delegation many IoT sensors and actuators in a home, but at some point running out of memory or computational footprint or even network resources to protect themselves. A service provider head end node or central office based servers can then be delegated the proxy nodes' services to secure aspects of the prior proxy-based applications that cannot be locally supported, and so on.

Moreover, the proxy node may aggregate, filter, correlate and forward data from multiple edge nodes, such that the data acquires greater value than a simple sum of the parts. For example, in the case of filtering, noise and other spurious information may be removed by the proxy node. Consequently, less effort is required to understand the meaning of the results, increasing the value of the results. Similarly, for correlation, patterns may for be detected by the proxy node over a time interval, or across a spatial distribution, or across different types of edge nodes, such as sensors, increasing the value of the results. Furthermore, the actions of edge nodes, such as actuators, may be coordinated, delayed, or rejected.

The edge nodes may also delegate other functions, in addition to its applications, security and update functions to proxy node. For example, an edge node could construct a timeline of its measurements and do local noise filtering upon them. Alternatively, the edge node could delegate this computation to the proxy node with possible energy trade-offs between the filtering computational load vs. the export of the raw data over the network to the proxy node.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing embodiments without departing from the scope of the present techniques.

As will be appreciated from the foregoing specification, techniques are described providing a machine-implemented method for protecting at least one edge node in a network of nodes.

In embodiments, all communications to and from said at least one edge node go through said proxy node. This enables the proxy node to protect the edge nodes.

In embodiments, the application for said at least one edge node is provided at said proxy node following said coupling of said at least one edge node with said proxy node.

In embodiments, the method further comprises: determining that an update for said at least one edge node is available; installing said update in said isolated area associated with said at least one edge node; and rebooting said at least one edge node and said proxy node following installation of said update. The isolated areas provided at the proxy node enables the proxy node to provided security and update function for multiple different edge nodes.

In embodiments, the application for said at least one edge node is provided at said proxy node following said determination that said update for said edge node is available.

In embodiments, the method further comprises: determining that said update has been installed successfully; and decreasing said reboot frequency of said at least one edge node and said reboot frequency of said proxy node. Following successful installation of an update the edge node may return to a normal reboot frequency, as the threat or vulnerability has been overcome by the update.

In embodiments, the method further comprises: determining that said update has not been installed successfully; and maintaining said increased reboot frequencies at said at least one edge node and said proxy node. By maintaining the increased reboot frequency when an update has not been successfully installed, an attacker's ability to sustain a corrupted infection is frustrated.

In embodiments, the method further comprises: linking said application for said at least one edge node provided at said proxy node to a communications module provided at said at least one edge node. By providing the edge node application at the proxy node, the edge node does not require the resources to install an update and can be a simple, low cost IoT devices, whilst increasing the protection available to the edge node and the entire system.

In embodiments, the method further comprises: removing a link between an application for said at least one edge node provided at said at least one edge node and said communications module provided at said edge node.

In embodiments, the method further comprises: decreasing said reboot frequency of said at least one edge node and said reboot frequency of said proxy node to an update frequency prior to installing said update. Reducing the reboot frequency to an update frequency simplifies installation of the update.

In embodiments, the method further comprises: providing a plurality of isolated areas, each isolated area associated with one or more of said at least one edge nodes of the same type. By providing a plurality of isolated areas, a proxy node can provide the application, security and update functions for a plurality of different edge nodes and a plurality of different types of edge nodes.

As will be appreciated from the foregoing specification, techniques are described providing proxy node for protecting at least one edge node in a network of nodes.

In embodiments, the proxy node comprises a plurality of isolated areas, each isolated area associated with one or more of said at least one edge nodes of the same type. Providing different isolated areas at the proxy node enables the proxy node to provide application, security and update functions for multiple different types of edge nodes.

In embodiments, the at least one isolate area for said at least one edge node is linked to a communications module provided at said at least one edge node.

The invention claimed is:

1. A machine-implemented method for protecting at least one edge node in a network of nodes, the method comprising:
communicatively coupling said at least one edge node with a proxy node;
delegating one or more functions of said at least one edge node to said proxy node by providing an application for said one or more functions in an isolated area at said proxy node, said isolated area associated with said at least one edge node;
determining that an update for said at least one edge node is required;
increasing a reboot frequency of said at least one edge node following said determination that an update is required, said edge node reboot frequency increasing from an edge node reboot frequency to a protective edge node reboot frequency; and
increasing a reboot frequency of said proxy node following said determination that an update is required, said proxy node reboot frequency increasing from a proxy node reboot frequency to a protective proxy node reboot frequency.

2. The method of claim 1, wherein all communications to and from said at least one edge node go through said proxy node.

3. The method of claim 2, wherein said application for said at least one edge node is provided at said proxy node following said coupling of said at least one edge node with said proxy node.

4. The method of claim 2, further comprising:
determining that an update for said at least one edge node is available;
installing said update in said isolated area associated with said at least one edge node; and
rebooting said at least one edge node and said proxy node following installation of said update.

5. The method of claim 4, wherein said application for said at least one edge node is provided at said proxy node following said determination that said update for said edge node is available.

6. The method of claim 4, further comprising:
determining that said update has been installed successfully; and
decreasing said reboot frequency of said at least one edge node and said reboot frequency of said proxy node.

7. The method of claim 4, further comprising:
determining that said update has not been installed successfully; and
maintaining said increased reboot frequencies at said at least one edge node and said proxy node.

8. The method of claim 2, further comprising:
linking said application for said at least one edge node provided at said proxy node to a communications module provided at said at least one edge node.

9. The method of claim 8, further comprising:
removing a link between an application for said at least one edge node provided at said at least one edge node and said communications module provided at said edge node.

10. The method of claim 4, further comprising:
decreasing said reboot frequency of said at least one edge node and said reboot frequency of said proxy node to an update frequency prior to installing said update.

11. The method of claim 2, further comprising:
providing a plurality of isolated areas, each isolated area associated with one or more of said at least one edge nodes of the same type.

12. A machine-implemented method for protecting at least one edge node in a network of nodes, the method comprising:
communicatively coupling at least one of a plurality of edge nodes with a proxy node;
delegating one or more functions of at least one of the plurality of edge nodes to said proxy node by providing an application for said one or more functions to an isolated area at said proxy node, wherein the proxy node maintains said isolated area for one or more of the plurality of edge nodes;
determining that an update for at least one of the plurality of edge nodes is available;
installing said update in said isolated area at said proxy node; and
performing a reboot at the at least one of the plurality of edge nodes and associated isolated area of said proxy node following installation of said update,
wherein the reboot at the at least one of the plurality of edge nodes and at the associated isolated area of said proxy node occurs at a protective reboot frequency that is different from a non-protective reboot frequency.

13. The method of claim 12, wherein all communications to and from said edge node go through said proxy node.

14. The method of claim 13, wherein said application for said at least one edge node is provided at said proxy node following said coupling of said at least one edge node with said proxy node.

15. The method of claim 13, wherein said application for said at least one edge node is provided at said proxy node following said determination that said update for said edge node is available.

16. A non-transitory, computer-readable storage medium comprising computer code which when executed by one or more computers causes the one or more computers to perform the following method for protecting at least one edge node in a network of nodes, the method comprising:
communicatively coupling said at least one edge node with a proxy node;
delegating one or more functions of said at least one edge node to said proxy node by providing an application for said one or more functions in an isolated area at said proxy node, said isolated area associated with said at least one edge node;
determining that an update for said at least one edge node is required;
increasing a reboot frequency of said at least one edge node following said determination that an update is required, said edge node reboot frequency increasing from an edge node reboot frequency to a protective edge node reboot frequency; and
increasing a reboot frequency of said proxy node following said determination that an update is required, said proxy node reboot frequency increasing from a proxy node reboot frequency to a protective proxy node reboot frequency.

17. The method of claim 1, wherein proxy node reboot frequency is only increased at said isolated area associated with said at least one edge node.

* * * * *